(12) United States Patent
Scott et al.

(10) Patent No.: US 7,337,941 B2
(45) Date of Patent: Mar. 4, 2008

(54) FLUX COATED BRAZING SHEET

(75) Inventors: Darwin H. Scott, deceased, late of Mechanicsville, VA (US); by Deborah B. Scott, legal representative, Mechanicsville, VA (US); Raymond J. Kilmer, Lancaster, PA (US); Joseph R. Dougherty, Schwenksville, PA (US); Robert P. Anthony, Norristown, PA (US)

(73) Assignee: Alcoa Inc., Pittsburgh, PA (US)

( * ) Notice: Subject to any disclaimer, the term of this patent is extended or adjusted under 35 U.S.C. 154(b) by 85 days.

(21) Appl. No.: 10/419,520

(22) Filed: Apr. 21, 2003

(65) Prior Publication Data

US 2004/0009358 A1    Jan. 15, 2004

Related U.S. Application Data

(60) Provisional application No. 60/374,398, filed on Apr. 22, 2002.

(51) Int. Cl.
*B23K 31/02* (2006.01)
*B23K 35/34* (2006.01)

(52) U.S. Cl. .................. 228/207; 228/223; 228/224; 148/24

(58) Field of Classification Search ............ 228/205, 228/207–223, 56.3, 183; 148/23, 24; 428/469
See application file for complete search history.

(56) References Cited

U.S. PATENT DOCUMENTS

| 4,228,214 A | | 10/1980 | Steigelman et al. |
| 4,513,062 A | * | 4/1985 | Suzuki et al. ............... 428/565 |
| 4,981,526 A | * | 1/1991 | Kudo et al. .................. 148/25 |
| 5,156,326 A | * | 10/1992 | Gibson ...................... 228/223 |
| 5,173,126 A | * | 12/1992 | Ogura et al. ................. 148/23 |
| 5,330,090 A | * | 7/1994 | Iwai ......................... 228/56.3 |
| 5,398,864 A | * | 3/1995 | Eichhorn et al. .......... 228/183 |
| 5,504,296 A | * | 4/1996 | Sato et al. ................ 219/85.1 |
| 5,547,517 A | * | 8/1996 | Iwai ........................... 148/24 |

FOREIGN PATENT DOCUMENTS

| EP | 0552567 | | 7/1993 |
| EP | 0980738 | | 2/2000 |
| EP | 1127653 | | 8/2001 |
| JP | 54-82342 | * | 6/1979 |
| JP | 60-98691 | * | 6/1985 |
| SU | 158782 A1 | | 12/1962 |
| SU | 359117 A1 | | 1/1973 |
| WO | 0073014 A1 | | 12/2000 |

* cited by examiner

*Primary Examiner*—Kiley Stoner
(74) *Attorney, Agent, or Firm*—Greenberg Traurig LLP; Peter J. Borghetti

(57) ABSTRACT

A brazing flux mixture comprised of brazing flux, a polyvinyl butyral resin binder, and an organic solvent which can be applied over an entire aluminum alloy brazing sheet, or can be applied on the brazing sheet only where metallurgical bonds or joints are required, that is sufficiently durable to withstand processing operations and also provides good metallurgical bonds upon brazing.

17 Claims, 1 Drawing Sheet

FLUX COATED BRAZING SHEET

RELATED APPLICATION

This application claims the benefit of U.S. Provisional Application Ser. No. 60/374,398, filed Apr. 22, 2002, entitled "Flux Coated Brazing Sheet".

FIELD OF THE INVENTION

The present invention relates to joining together two or more metal objects by brazing. More particularly, the present invention relates to a brazing flux mixture and a method for preparing and using said brazing flux coating mixture to make brazing sheets.

BACKGROUND OF THE INVENTION

Aluminum alloys are used in the construction of heat exchangers, such as evaporators, radiators, heaters and condensers and the like, due to their light weight and excellent heat transfer properties. Heat exchangers are typically manufactured from aluminum alloy parts that are formed from rolled sheet or extruded products. The parts are typically assembled, fixtured, cleaned and joined in a brazing process. In a brazing process, two or more parts, each clad with an aluminum brazing alloy (e.g., an aluminum-silicon alloy), are positioned so that surfaces to be joined on the parts are in close proximity to each other. The parts are heated to a temperature which melts the braze alloy but not the core alloy on underlying parts. The braze alloy from each part melts together to close the gap which separates the parts. Upon cooling, the brazing alloy solidifies and forms a metallurgical bond between the parts. The brazing alloy is typically introduced onto the surfaces of the aluminum stock by cladding thereto in a roll bonding operation.

A common brazing practice includes cleaning of the formed parts using a suitable solvent to remove oils and the like from the surfaces to be brazed followed by application of a suitable flux to the pre-brazed parts to be joined. The fluxed parts are heated in a controlled atmosphere, such as dry nitrogen, to retard oxidation. Flux is used to reduce the oxides on the faying surfaces of the parts that are to be joined by brazing.

In most commercial brazing operations, flux is applied after fabrication of the individual parts to be brazed, either after assembly and fixturing of the parts (e.g., as a radiator, condenser, or heater) or prior to assembly for heat exchangers having internal brazed joints (e.g., evaporators) and prior to brazing. The flux may be applied directly as a dry powder or mixed with a carrier such as water or alcohol and applied as slurry over the entire work piece. When applied as slurry, the carrier is subsequently removed by a drying step, leaving the flux as a powder on the surface of the parts to be brazed.

Flux is only required in areas where metallurgical bonds or joints are required. Nevertheless, it is common manufacturing practice to apply flux over the entire assembly, often including the fixtures used to contain the parts in the furnace during brazing. This results in overuse and waste of flux, the need to clean the fixtures and increased maintenance of the furnace due to the corrosive nature of the flux. Moreover, the process of applying and removing excess flux is time consuming and expensive. It should be noted that flux is often loosely adhered to the parts as a powder. Hence, care must be taken to avoid removal of the flux during any handling of the fluxed parts prior to brazing.

An alternative to fluxing an entire assembly of parts is to apply flux to the metal sheets prior to working or forming the sheets into parts. Applying flux to a metal sheet prior to forming the sheet into a desired part is advantageous in that the flux can be applied only on the braze alloy cladding where joints are to be formed between parts. The unclad areas of the metal, which are not to be joined, can remain free of flux. However, flux coated brazing sheet has not found broad commercial applications due to the rigorous demands on the flux coating. The flux on prefluxed sheet must survive stamping and forming operations, not degrade when exposed to the forming lubricants and not interfere with the brazing operation.

Thus, a need exists for a brazing flux mixture which can be applied over an entire aluminum alloy brazing sheet or can be applied on the brazing sheet only where metallurgical bonds or joints are required, that is sufficiently durable to withstand processing operations such as stamping, forming, and handling prior to brazing and also provides good metallurgical bonds upon brazing.

It is therefore an object of this invention to provide a brazing flux mixture which can be applied over an entire aluminum alloy brazing sheet, or can be applied on the brazing alloy only where metallurgical bonds or joints are required, that is sufficiently durable to withstand processing operations and also provides good metallurgical bonds upon brazing.

Additional objectives and advantages of our invention will become apparent to persons skilled in the art from the following detailed description of some particularly preferred embodiments.

SUMMARY OF THE INVENTION

The invention provides a brazing flux mixture for coating an unformed brazing sheet prior to sheet formation into a shaped product. The mixture is comprised of brazing flux, a polyvinyl butyral resin binder, and an organic solvent.

The invention further provides a method of making a brazing flux mixture comprising combining a brazing flux with a polyvinyl butyral binder to form a first mixture; shearing said first mixture to form a second mixture having uniformly dispersed brazing flux in said binder, and combining said second mixture with a organic solvent to form a brazing flux mixture.

The invention also provides a method of making a flux-coated aluminum brazing sheet comprising:

(a) combining a brazing flux with polyvinyl butyral binder and optionally an organic solvent to form a first mixture;

(b) shearing said first mixture to form a second mixture having uniformly dispersed brazing flux particles in said second mixture;

(c) combining said second mixture with an organic solvent to form a brazing flux mixture;

(d) coating at least a portion of the surface of an aluminum brazing sheet with said brazing flux mixture; and (e) drying said brazing flux mixture on said aluminum brazing sheet surface.

DETAILED DESCRIPTION OF PREFERRED EMBODIMENTS

Figure 1:
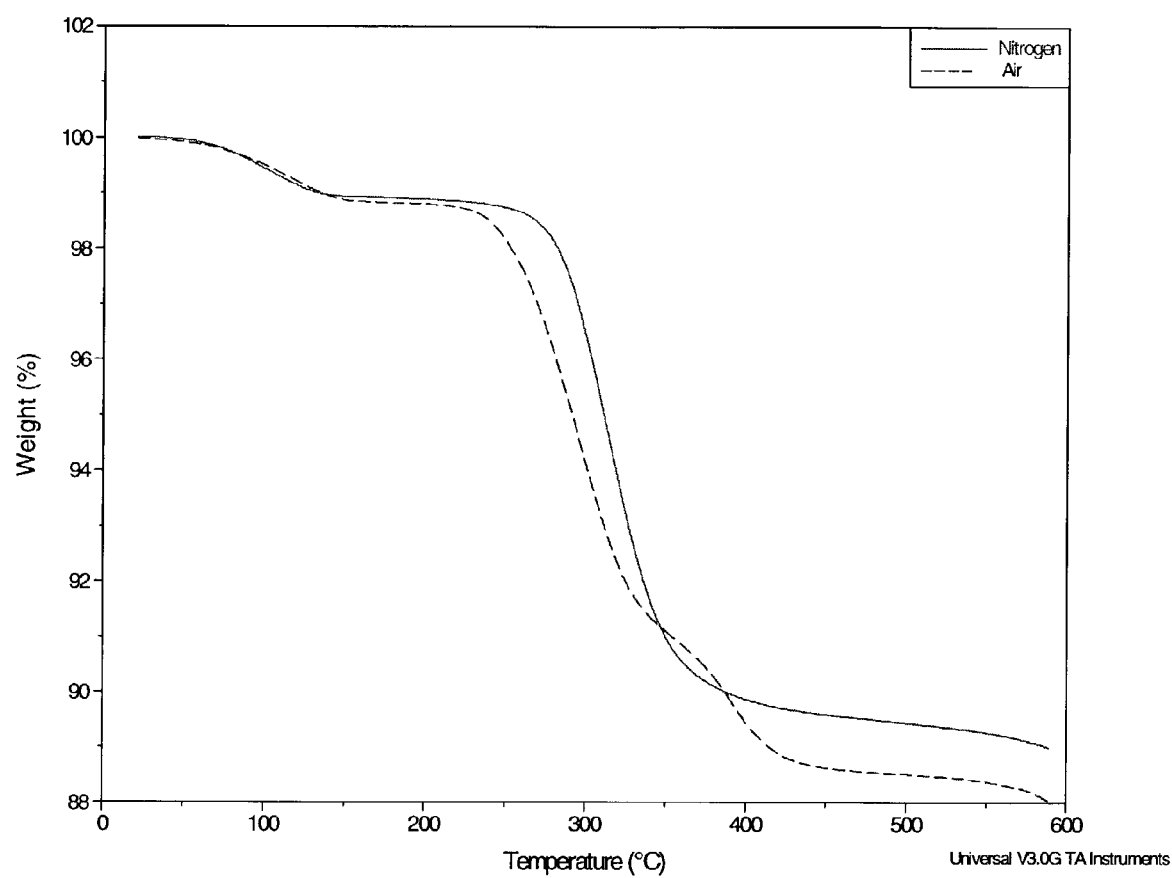
FIG. 1 is a graph of the weight percent of polyvinyl butyral binder on a coated alloy versus heating.

The present invention provides a brazing flux mixture which can be applied over an entire aluminum alloy brazing sheet or can be applied on a brazing sheet only where metal joints or bonds are needed. The brazing flux mixture is sufficiently durable to survive manufacturing operations such as forming and stamping of parts from the aluminum alloy brazing sheet, and provides acceptable metallurgical brazing bonds.

The brazing flux mixture is comprised of brazing flux, a polyvinyl butyral resin binder and an organic solvent.

The brazing flux can be any flux material suitable for joining two or more aluminum alloy objects together by brazing. The preferred brazing flux is comprised of potassium fluoroaluminate ($K_{1-3}AlF_{4-6}$). Such preferred fluxes are available commercially from Solvay Fluor und Derivate GmbH under the trademark NOCOLOK® flux. Suitable brazing fluxes may also include elements such as chlorides, cesium ($Cs_{0.02}K_{1-2}AlF_{4-5}$) to provide increased tolerance to magnesium in the base metal, zinc ($KZnF_3$) to provide for corrosion resistance, or silicon ($K_{1-3}AlF_{4-6}$ plus silicon powder) to promote brazing joint formation.

The polyvinyl butyral resin binder of this invention is a reaction product of polyvinyl alcohol and butyraldehyde. Preferred polyvinyl butyral resin binders are binders having about 10 to 21 wt. % vinyl alcohol content, about 1 to 2 wt. % vinyl acetal content, and having a viscosity at 10% TNV in 95% ethyl alcohol in the range of 15 to 2500 centipoise at 25° C. (77° F.). Preferred binders are available commercially, such as PIOLOFORM® BN18 resins from Wacker Polymer Systems GmbH & Company KG, Sekisui S-Lec BM5Z available from Synthetic Specialties Company, Middleton, N.J, and Butvar B-75 Resins from Solutia.

The organic solvent used for this invention can be any organic solvent which facilitates uniform mixing of the brazing flux and polyvinyl butyral resin binder. Esters, such as ethyl acetate, n-butyl acetate, n-propyl acetate and ketones, such as acetone and cyclohexanone can be used as solvents. Blends of alcohols and aromatic hydrocarbons such as toluene are suitable solvents despite the fact that aromatic hydrocarbons are not individually active solvents for polyvinyl butyral resins. The preferred solvents for this invention are alcohols, such as ethyl alcohol, isopropyl alcohol, n-butanol, n-propyl alcohol and diacetone alcohol. Glycol ethers and glycol ether acetates such as dipropylene glycol monomethyl ether and propylene glycol methyl ether acetate are also preferred as solvents for this invention. The most preferred solvents are mixtures of either propylene glycol methyl ether acetate, isopropyl alcohol and ethyl acetate, or dipropylene monomethyl glycol ether, isopropyl alcohol and ethyl acetate.

The brazing flux mixture is prepared by combining a brazing flux with a polyvinyl butyral binder and then mixing the combined flux and binder with an organic solvent. The preferred method for combining flux and binder is to subject the flux and binder to shearing. Any shearing method known to the skilled artisan may be applied such as high-speed mixers, media mills or 2-roll mills. The preferred shearing method is to combine the brazing flux and polyvinyl butyral binder in a 2-roll mill. A two-roll mill comprises two cylindrical rolls that rotate at different speeds and in opposite directions in relation to each other. Shearing occurs as the flux and binder blend is passed between the rolls.

To facilitate the shearing operation, an organic solvent such as an alcohol, an acetate, a glycol ether, or mixtures thereof, as previously described herein, may be added to the flux-binder combination prior to or during shearing. The most preferred solvent for shearing is isopropyl alcohol.

The amount of binder suitable for this invention is an amount sufficient to maintain adherence of the flux to a surface of an object to be brazed, during handling, forming and stamping operations, yet does not interfere with the formation of brazing joints. The flux-binder combination subjected to shearing contains from about 5 to 30 wt. % binder, from about 70 to 95 wt. % flux, and optionally up to about 10 wt. % organic solvent to equal a total of 100 wt. %. The most preferred flux-binder combination subjected to shearing contains from about 5 to 15 wt. % binder, and from about 85 to 95 wt. % flux, and optionally up to about 10 wt. % organic solvent to equal a total of 100 wt. %.

The shearing operation uniformly distributes the flux in the binder and helps provide uniform flux particle size within the mixture. The inventors believe that the flux particle sizes of this invention provide for a flux coating which can be uniformly applied to an object to be brazed and facilitate adhesion of the dry flux onto the metal object. Although the flux particle size will vary depending on the amount of shearing applied to the mixture, mixture viscosity and the composition of the mixture the inventors believe that the preferred particle size is about 1 micron or smaller.

The flux-binder combination is then dissolved in a polar organic solvent or a mixture of polar organic solvents to form a mixture suitable for coating an aluminum alloy brazing sheet or part to be brazed.

The amount of solvent in the invention mixture is an amount sufficient to evenly distribute the flux and binder onto a metal substrate. The preferred amount of solvent is from about 10 to 70 wt. % solvent and from 30 to 90 wt. % flux-binder combination. The most preferred amount of solvent in the mixture is from about 30 to 60 wt. % solvent and from 40 to 70 wt. % flux-binder combination.

The most preferred brazing mixtures of this invention are comprised of about 62 wt. % potassium fluoroaluminate flux, about 6.9 wt. % polyvinyl butyral resin binder, about 27.5 wt. % propylene glycol methyl ether acetate of dipropylene monomethyl ether, about 2.3 wt. % isopropyl alcohol, and about 1.3 wt. % ethyl acetate.

The solvent based mixture provides for good surface wetting on the aluminum brazing sheet, yet depending on the aluminum product to be coated, it may still be desirable to clean the brazing sheet prior to application of a coating of the invention brazing flux mixture. For sheet that is produced in an H1X temper and has residual-rolling lubricants present on the surface, cleaning may improve adhesion of the invention mixture. For products produced in —O or —H2X tempers, where the rolling lubricants may be burned off during a final anneal, cleaning of the brazing sheet prior to application of the invention brazing flux mixture would have less effect on mixture adhesion. Suitable cleaning solutions include organic solvents and aqueous cleaners.

The invention brazing flux mixture can be applied to an aluminum alloy brazing sheet by conventional rolling coating processes, by immersion processes, by spray processes, by manual coating such as by brushing or the like. Depending on the brazing requirements, the sheet may be fully coated or partially coated in a pattern on one or both sides. After coating, the sheet may be heated to drive off the solvent component of the invention mixture and to facilitate drying. Depending upon brazing requirements, the amount of dry flux remaining on the surface of the sheet is in the range of about 2 to 40 grams of flux per square meter of brazing sheet ($g/m^2$). Preferably from about 3-20 $g/m^2$ of brazing sheet and most preferably the flux loading is from about 3 g/m² to about 10 g/m².

To aid in materials identification, a suitable color pigment can be added to the coating formulation to produce a colored coating. Suitable pigments include Pigment Blue 15 Phthalo Blue, Thalocyanine Blue 15:4, Pigment Red 52 B in Red, Bon Red 52, Pigment Green 7 Phthalo Green, and Thalocyanine Green 7.

Any aluminum alloy brazing sheet may be used with the flux coating of this invention. The aluminum brazing sheet preferably comprises a 3XXX, 5XXX, or 6XXX aluminum core alloy clad on at least one side with a 4XXX series brazing alloy. The inventors also believe the flux coating of this invention can be used on unclad aluminum alloy sheet and extrusions.

The invention will now be further described with reference to a number of specific examples which are to be regarded solely as illustrative and not as restricting the scope of the present invention.

EXAMPLE 1

A coating, C31, was prepared by combining 10 wt. % of polyvinyl butyral with 90 wt. % of NOCOLOK® potassium fluoroaluminate flux and subjecting the mixture to a high shear dispersion process using a two-roll mill. Next, 68.9 wt. % of the highly dispersed mixture of polyvinyl butyral and NOCOLOK® flux was combined and mixed with 31.1 wt. % of dipropylene glycol mono methyl ether.

The coating was uniformly applied to both sides of aluminum brazing sheet samples by making drawdowns with a #6, #7, #8 or a #9 Meyer rod. The aluminum brazing sheet was of the type commercially used in the production of automotive heat exchangers (e.g., evaporators) and had a 3XXX aluminum core alloy containing about 1% manganese, 0.3% copper and 0.15% titanium. The 4XXX aluminum braze alloy clad on each side of the core comprised about 10% of the total sheet thickness and contained about 10% silicon. The aluminum sheet was about 0.017 inches thick and had been fully annealed to an —O temper. The coating was dried by placing the sheet into a 500° F. furnace for a period of 15 seconds to evaporate the solvent. Depending upon which Meyer rod was used to make the draw down, dry coating weights on each side of the aluminum brazing sheet samples varied from about 5 to 11 grams/meter² and the dry coating thicknesses varied from about 0.0002 to 0.0006 inch.

To evaluate the scratch resistance, pencil hardness measurements were made on the coated sheet. Pencil hardness increases in the order of 3B, 2B, B, HB, F.

To assess coating adhesion and in preparation for the brazing tests, mini evaporator plates patterned after actual production evaporator plates were stamped from the coated sheet on a five-stage progressive die using a commercially available lubricant, Draw Lube 485 from Circle-Prosco Inc., Bloomington, Ind. The stamped plates were rubbed with a finger, visually examined for coating loss and rated as follows.

Acceptable: Coating able to withstand forming operation, only minor coating loss in highly formed areas of the formed plate.

Unacceptable: Coating not able to withstand forming operation, significant coating loss from the formed plate.

Mini evaporators were prepared for the brazing tests by alternately stacking plates stamped from the coated sheet and non-coated 3003 alloy fins in suitable fixture to hold the parts in place. The fixtured parts were then placed in a furnace and brazed by heating to about 600° C. in a suitable nitrogen gas atmosphere. The brazeability evaluation criteria were as follows.

Acceptable: The braze joint is a well-formed fillet and there is very little or no black carbon residue on the surface.

Unacceptable: The braze joint is small and incomplete or there is a significant amount of black residue on the surface.

Scratch resistance Coating adhesion and brazeability test results for the coating are summarized in Table 1 below.

TABLE 1

| Coating - Meyer Rod | Coating Weight (g/m²) | Scratch Resistance | Coating Adhesion | Brazeability |
|---|---|---|---|---|
| C31 - #6 | 7.3 | 2B | Acceptable | Acceptable |
| C31 - #7 | 8.4 | 3B | Acceptable | Acceptable |
| C31 - #8 | 9.0 | 2B | Acceptable | Acceptable |
| C31 - #9 | 10.7 | 2B | Acceptable | Acceptable |

EXAMPLE 2

Weight loss tests were conducted to assess the compatibility of the coating and two commercial forming lubricants. Weighed 2.5 inch×5 inch samples of sheet coated by using a #9 Meyer rod were immersed in beakers containing two commercial forming lubricants, Circle-Prosco Inc. Draw Lube 485 and Calvary Industries Inc. CAL Lube 180-M+, at room temperature. After five days, the samples were removed from the lubricants, thermally degreased by heating to about 450° F., and reweighed. The very small differences in initial and final weights shown below indicated that the coating was compatible with the two forming lubricants.

TABLE 2

| | Average Weight Loss (grams) | |
|---|---|---|
| Coating - Meyer Rod | Draw Lube 485 | CAL Lube 180-M+ |
| C31 - #9 | .0030 | .0011 |

EXAMPLE 3

Thermal gravimetric analyses were conducted on dried samples of the coating. Coating samples were continuously weighed while being heated at 10° C./min from room temperature to about 600° C. in both air and nitrogen. Test results shown in FIG. 1 indicated that volatilization of the polyvinyl butyral binder was about complete by the time the coating sample reached 500° C.

EXAMPLE 4

Binders other than polyvinyl butyral were investigated. Samples containing both RS and SS types of nitrocellulose including viscosity grades 10 to 15 centipoise and 60 to 80 seconds were tested. In an attempt to improve coating adhesion and scratch resistance, modifiers that were copolymers of butyl acrylate and vinyl isobutyl ether, butyl benzyl phthalate and dioctyl adipate were added to the nitrocellulose in the range of 1 to 100 wt. %. The experimental binders were combined with NOCOLOK® potassium fluoroaluminate flux in varying proportions to produce the 31 coatings described in Table 3. To facilitate mixing and to reduce flux particle size, the flux-binder mixtures were subjected to processing on several different types of dispersion equipment, including a Cowles high-speed mixer, a steel shot media mill and a 2-roll shearing mill. Subsequently the flux-binder mixtures were combined with various solvents including isopropyl acetate, ethyl acetate, butyl acetate, methoxypropanol acetate, dipropylene monomethyl glycol ether, isopropyl alcohol and ethyl alcohol. Polyvinyl pyrolidone was added to some of the coating formulations as a suspending agent to reduce flux drop out. Polyethylene was added to some coating formulations to improve coating lubricity. The coatings were uniformly applied to aluminum brazing sheet samples by making draw downs with different Meyer rods varying from a #3 up to a #22. The aluminum brazing sheet was of the type commercially used in the production of automotive heat exchangers (e.g., evaporators) and had a 3XXX aluminum core alloy containing about 1% manganese, 0.3% copper and 0.15% titanium. The 4XXX aluminum braze alloy clad on each side of the core comprised about 10% of the total sheet thickness and contained about 10% silicon. The aluminum sheet was about 0.017 inches thick and had been fully annealed to an —O temper. The coatings were dried by placing the sheets into a 500° F. furnace for a period of 15 seconds to evaporate the solvent. Depending upon which Meyer rod was used to make the draw down, dry coating weights on the aluminum brazing sheet samples varied from about 5 to 35 grams/meter$^2$ and the dry coating thicknesses varied from about 0.0002 to 0.0012 inches.

The scratch resistance of the coating was subjectively evaluated by scratching the coated sheet with a fingernail. The sheet was rated as being either acceptable or not acceptable.

To assess coating adhesion, either small cup specimens or mini evaporator plates, patterned after actual production evaporator plates, were stamped from the coated sheet using a commercially available lubricant, Draw Lube 485 from Circle-Prosco Inc. The stamped plates were rubbed with a finger, visually examined for coating loss and rated as follows.

Acceptable: Coating able to withstand forming operation, only minor coating loss in highly formed areas of the formed plate.

Unacceptable: Coating not able to withstand forming operation, significant coating loss from the formed plate.

Brazeability of the sheet was evaluated by brazing standard "T joints" specimens or by brazing mini evaporators produced by alternately stacking plates stamped from the coated sheet and non-coated 3003 alloy fins. The test specimens were placed in a furnace and brazed by heating to about 600° C. in a suitable nitrogen gas atmosphere. The brazeability evaluation criteria were as follows.

Acceptable: The braze joint is a well-formed fillet and there is very little or no black carbon residue on the surface.

Unacceptable: The braze joint is small and incomplete or there is a significant amount of black residue on the surface.

Scratch resistance, coating adhesion and brazeability test results for the coating are summarized in Table 3.

TABLE 3

| | Flux Loading | Binder | Solvent | Wax | Milling | Scratch Resistance Fingernail | Stamped Cup Adhesion | Brazing T test or Mini Evap |
|---|---|---|---|---|---|---|---|---|
| C1 | 50% Flux | Nitrocellulose - 5.2% Copolymer butyl acrylate and vinyl acrylate - 1% | Isopropyl acetate - 40.6% Ethyl Acetate (from resin) - 1.0% Isopropyl alcohol (from N/C) - 2.2% | None | None | Not acceptable | Not acceptable | Acceptable |
| C2 | 45% Flux | Nitrocellulose - 9.4% Copolymer butyl acrylate and vinyl acrylate - 1.9% | Isopropyl acetate - 37.8% Ethyl Acetate (from resin) - 1.9% Isopropyl alcohol (from N/C) - 4.0% | None | None | Not acceptable | Not acceptable | Not acceptable |
| C3 | 30% Flux | Nitrocellulose - 15% Copolymer butyl acrylate and vinyl acrylate - 5% | Isopropyl acetate - 47.4% Ethyl Acetate (from resin) - 0.9% Isopropyl alcohol (from N/C) - 1.7% | None | 2-roll | Not acceptable | Not acceptable | Not acceptable |
| C4 | 49% Flux | Nitrocellulose - 5.1% Copolymer butyl acrylate and vinyl acrylate - 1% | Isopropyl acetate - 39.8% Ethyl Acetate (from resin) - 0.9% Isopropyl alcohol (from N/C) - 2.2% | Polyethylene - 2.0% (Micronized) | Cowles High Speed | Not acceptable | Not acceptable | Acceptable |
| C5 | 49% Flux | Nitrocellulose - 5.1% Copolymer butyl acrylate and vinyl acrylate - 1% | Isopropyl acetate - 39.8% Ethyl Acetate (from resin) - 0.9% Isopropyl alcohol (from N/C) - 2.2% | Polyethylene - 2.0% Higher melting point | Cowles High Speed | Not acceptable | Not acceptable | Acceptable |
| C6 | 49% Flux | Nitrocellulose - 5.1% Copolymer butyl acrylate and vinyl acrylate - 1% | Isopropyl acetate - 39.8% Ethyl Acetate (from resin) - 0.9% Isopropyl alcohol (from N/C) - 2.2% | Polyethylene - 2.0% (Micronized) | Steel Shot Media High Speed | Not acceptable | Not acceptable | Acceptable |
| C7 | 49% Flux | Nitrocellulose - 5.1% Copolymer butyl acrylate and vinyl acrylate - 1% | Isopropyl acetate - 40.5% Ethyl Acetate (from resin) - 1.0% Isopropyl alcohol (from N/C) - 2.2% | Polyethylene - 1.0% (Micronized) | Steel Shot Media High Speed | Not acceptable | Not acceptable | Acceptable |

TABLE 3-continued

| | Flux Loading | Binder | Solvent | Wax | Milling | Scratch Resistance Fingernail | Stamped Cup Adhesion | Brazing T test or Mini Evap |
|---|---|---|---|---|---|---|---|---|
| C8 | 49% Flux | Nitrocellulose - 4.9% Copolymer butyl acrylate and vinyl acrylate - 1% | Isopropyl acetate - 38.0% Ethyl Acetate (from resin) - 1.0% Isopropyl alcohol (from N/C) - 2.1% | Polyethylene - 4.0% (Micronized) | Steel Shot Media High Speed | Not acceptable | Not acceptable | Acceptable |
| C10 | 52.40% Flux | Nitrocellulose - 5.4% Copolymer butyl acrylate and vinyl acrylate - 1.1% Polyvinyl Pyrolidone - 1% (suspending agent) | Isopropyl acetate - 34.8% Isopropyl alcohol (from N/C) - 3.3% | Polyethylene - 2.0% (Micronized) | Steel Shot Media High Speed | Not acceptable | Not acceptable | Not acceptable |
| C11 | 52.40% Flux | Nitrocellulose - 5.4% Copolymer butyl acrylate and vinyl acrylate - 1.1% Polyvinyl Pyrolidone - 2.0% (suspending agent) | Isopropyl acetate - 33% Isopropyl alcohol (from N/C) - 4.1% | Polyethylene - 2.0% (Micronized) | Steel Shot Media High Speed | Not acceptable | Not Tested | Not acceptable |
| C3A | 56% Flux | Nitrocellulose - 5.1% Copolymer butyl acrylate and vinyl acrylate - 1.1% | Isopropyl acetate - 32.5% Ethyl Acetate (from resin) - 1.2% Isopropyl alcohol (from N/C) - 2.1% | Polyethylene - 2.0% (Micronized) | 2-roll | Not acceptable | Not Tested | Not acceptable |
| C3B | 56% Flux | Nitrocellulose - 5.1% Copolymer butyl acrylate and vinyl acrylate - 1.1% | Butyl acetate - 32.5% Ethyl Acetate (from resin) - 1.2% Isopropyl alcohol (from N/C) - 2.1% | Polyethylene - 2.0% (Micronized) | 2-roll | Not acceptable | Not Tested | Not acceptable |
| C12 | 56% Flux | Nitrocellulose - 5.1% Copolymer butyl acrylate and vinyl acrylate - 1.1% | Isopropyl acetate - 34.5% Ethyl Acetate (from resin) - 1.2% Isopropyl alcohol (from N/C) - 2.1% | None | 2-roll | Not acceptable | Not acceptable | Acceptable |
| C12A | 56% Flux | Nitrocellulose - 5.1% Copolymer butyl acrylate and vinyl acrylate - 1.1% | Butyl acetate - 34.5% Ethyl Acetate (from resin) - 1.2% Isopropyl alcohol (from N/C) - 2.1% | None | 2-roll | Not acceptable | Not acceptable | Not acceptable |
| C13 | 56% Flux | Nitrocellulose - 5.1% Copolymer butyl acrylate and vinyl acrylate - 1.1% Butyl benzyl phthalate - 4.1% | Isopropyl acetate - 30.4% Ethyl Acetate (from resin) - 1.2% Isopropyl alcohol (from N/C) - 2.1% | None | 2-roll | Not acceptable | Not acceptable | Acceptable |
| C14 | 56% Flux | Nitrocellulose - 5.7% Copolymer butyl acrylate and vinyl acrylate - 2.3% | Isopropyl acetate - 27.7% Ethyl Alcohol - 4.9% Isopropyl Alcohol - 2.2% Ethyl Acetate - 1.2% | None | 2-roll | Not acceptable | Not acceptable | Acceptable |
| C15 | 56% Flux | Polyvinyl Butyral - 2.3% | Isopropyl acetate - 27.7% Ethyl Alcohol - 4.9% Isopropyl Alcohol - 2.2% Ethyl Acetate - 1.2% | None | 2-roll | Not acceptable | Not acceptable | Acceptable |
| C16 | 56% Flux | Copolymer butyl acrylate and vinyl acrylate - 5.2% Nitrocellulose - 5.2% | Isopropyl acetate - 26.3% Ethyl Acetate - 5.3% Isopropyl Alcohol - 2.1% | None | 2-roll | Not acceptable | Not acceptable | Acceptable |
| C17 | 56% Flux | Nitrocellulose 2.5% Butyl Benzyl Phthalate 4.5% | Isopropyl Acetate - 20.4% PM Acetate - 3.6% Isopropyl Alcohol - 2.1% Ethyl Acetate - 1.7% | None | 2-roll | Not acceptable | Not acceptable | Not acceptable |
| C18 | 62% Flux | Polyvinyl Butyral - 6.9% | Isopropyl Acetate - 23.4% PM Acetate - 4.1% Isopropyl Alcohol - 2.3% Ethyl Acetate - 1.3% | None | 2-roll | Not acceptable | Not acceptable | Not acceptable |
| C19 | 64% Flux | Polyvinyl Butyral - 2.7% Butyl Benzyl Phthalate - 4.4% | Isopropyl Acetate - 21.4% PM Acetate - 3.8% Isopropyl Alcohol - 2.3% Ethyl Acetate - 1.4% | None | 2-roll | Not acceptable | Not acceptable | Not acceptable |
| C20 | 64% Flux | Nitrocellulose 2.5% Dioctyl Adipate - 4.5% | Isopropyl Acetate - 20.4% PM Acetate - 3.6% Isopropyl Alcohol - 2.1% Ethyl Acetate - 1.7% | None | 2-roll | Not acceptable | Not acceptable | Not acceptable |

TABLE 3-continued

| | Flux Loading | Binder | Solvent | Wax | Milling | Scratch Resistance Fingernail | Stamped Cup Adhesion | Brazing T test or Mini Evap |
|---|---|---|---|---|---|---|---|---|
| C21 | 64% Flux | Nitrocellulose 2.7% Dioctyl Adipate - 4.4% | Isopropyl Acetate - 21.4% PM Acetate - 3.8% Isopropyl Alcohol - 2.3% Ethyl Acetate - 1.4% | None | 2-roll | Not acceptable | Not acceptable | Not acceptable |
| C22 | 55.5% Flux | Polyvinyl Butyral - 3.1% Nitrocellulose - 2.6% Copolymer butyl acrylate and vinyl acrylate - 0.5% | PM Acetate - 35.1% Isopropyl Alcohol - 2.1% Ethyl Acetate - 1.1% | None | 2-roll | Not acceptable | Not acceptable | Not tested |
| C23 | 59% Flux | Polyvinyl Butyral - 4.1% Nitrocellulose - 2.0% Copolymer butyl acrylate and vinyl acrylate - 0.4% | PM Acetate - 31% Isopropyl Alcohol - 2.3% Ethyl Acetate - 1.2% | None | 2-roll | Not acceptable | Not acceptable | Not tested |
| C24 | 55.5% Flux | Polyvinyl Butyral - 3.1% Nitrocellulose - 3.1% | PM Acetate - 35.1% Isopropyl Alcohol - 2.1% Ethyl Acetate - 1.1% | None | 2-roll | Not acceptable | Not acceptable | Not tested |
| C25 | 55.5% Flux | Polyvinyl Butyral - 2.1% Nitrocellulose - 2.1% Copolymer butyl acrylate and vinyl acrylate - 2.1% | PM Acetate - 35.1% Isopropyl Alcohol - 2.0% Ethyl Acetate - 1.1% | None | 2-roll | Not acceptable | Not acceptable | Not tested |
| C26 | 62% Flux | Nitrocellulose - 5.81% Copolymer butyl acrylate and vinyl acrylate - 1.2% | PM Acetate - 27.5% Isopropyl Alcohol - 2.3% Ethyl Acetate - 1.2% | None | 2-roll | Not acceptable | Not acceptable | Acceptable |
| C27 | 62% Flux | Polyvinyl Butyral - 6.9% | PM Acetate - 27.5% Isopropyl Alcohol - 2.3% Ethyl Acetate - 1.3% | None | 2-roll | Acceptable | Acceptable | Acceptable |
| C28 | 58.3% Flux | Polyvinyl Butyral - 10.3% | PM Acetate - 27.7% Isopropyl Alcohol - 2.2% Ethyl Acetate - 1.2% | None | 2-roll | Acceptable | Acceptable | Not Acceptable |
| C29 | 60% Flux | Polyvinyl Butyral - 3.35% Nitrocellulose - 3.35% Shellac - 1.34% | PM Acetate - 27.32% Isopropyl Alcohol - 2.3% Ethyl Acetate - 1.2% | None | 2-roll | Not acceptable | Not acceptable | Not Acceptable |
| C30 | 60% Flux | Nitrocellulose - 5.5% Shellac - 2.2% Copolymer butyl acrylate and vinyl acrylate - 1.1% | PM Acetate - 25.7% Isopropyl Alcohol - 2.3% Ethyl Alcohol - 1.9% Ethyl Acetate - 1.3% | None | 2-roll | Not acceptable | Not acceptable | Not Acceptable |
| C31 | 62% Flux | Polyvinyl Butyral - 6.9% | Dipropylene Monomethyl Glycol Ether - 27.5% Isopropyl Alcohol - 2.3% Ethyl Acetate - 1.3% | None | 2-roll | Acceptable | Acceptable | Acceptable |

Table 3 clearly shows that only a brazing flux coating mixture, comprising brazing flux, a polyvinyl butyral binder and an organic solvent provide a flux-binder coating on a metal object which is both sufficiently durable to maintain adherence on a metal object during stamping and forming and also provides a suitable brazing joint.

EXAMPLE 5

Coatings were formulated to evaluate the effects of polyvinyl butyral viscosity and flux/binder ratio on coating performance. Ten coatings, described in Table 4, were prepared by combining samples of commercially available polyvinyl butyral of different viscosities with NOCOLOK® potassium fluoroaluminate flux in varying proportions and subjecting the mixtures to a high shear dispersion process using a 2-roll mill. Subsequently, the highly dispersed mixtures of polyvinyl butyral and NOCOLOK® flux were combined and mixed with varying amounts of dipropylene glycol mono methyl ether.

The coatings were uniformly applied to both sides of aluminum brazing sheet samples by making draw downs with a #6, #7, #9 or a #12 Meyer rod. The aluminum brazing sheet was of the type commercially used in the production of automotive heat exchangers (e.g., evaporators) and had a 3XXX aluminum core alloy containing about 1% manganese, 0.3% copper and 0.15% titanium. The 4XXX aluminum braze alloy clad on each side of the core comprised about 10% of the total sheet thickness and contained about 10% silicon. The aluminum sheet was about 0.017 inches thick and had been fully annealed to an —O temper. The coatings were dried by placing the sheet into a 500° F. furnace for a period of 15 seconds to evaporate the solvent. Depending upon which Meyer rod was used to make the draw down, flux coating weights on each side of the aluminum brazing sheet samples varied from about 3.7 to 10.7 grams/meter$^2$.

To evaluate the scratch resistance of the coatings, pencil hardness measurements were made on dry coated sheet samples and on samples that were wetted with water. Pencil hardness increases in the order of 3B, 2B, B, HB, F.

To assess coating adhesion and in preparation for the brazing tests, mini evaporator plates patterned after actual production evaporator plates were stamped from the coated sheet on a five stage progressive die using a commercially available lubricant, Draw Lube 485 from Circle-Prosco Inc. The stamped plates were rubbed with a finger, visually examined for coating loss and rated as follows.

Acceptable: Coating able to withstand forming operation, only minor coating loss in highly formed areas of the formed plate.

Unacceptable: Coating not able to withstand forming operation, significant coating loss from the formed plate.

Mini evaporators were prepared for the brazing tests by alternately stacking plates stamped from the coated sheet and non-coated 3003 alloy fins in suitable fixture to hold the parts in place. The fixtured parts were then placed in a furnace and brazed by heating to about 600° C. in a suitable nitrogen gas atmosphere. The brazeability evaluation criteria were as follows.

Acceptable: The braze joint is a well-formed fillet and there is very little or no black carbon residue on the surface.

Unacceptable: The braze joint is small and incomplete or there is a significant amount of black residue on the surface.

Scratch resistance Coating adhesion and brazeability test results for the coating are summarized in Table 4 below.

TABLE 4

| Formulation | Composition | Meyer Rod | Flux Coating (g/m²) | Pencil Hardness Sheet Dry | Pencil Hardness Sheet Wet | Mini Evaporator Plates Adhesion | Mini Evaporator Plates Braze Performance |
|---|---|---|---|---|---|---|---|
| C32 90/10 - Flux/binder 60% TNV 12.38 lb/gal | Flux - 54% Sekisui S-Lec BM5Z (high viscosity PVB) - 6% Dipropylene Glycol Monomethyl Ether (DPM) - 40% | 5 | 5.2 | HB | <3B | Acceptable | Acceptable Large joints |
| | | 7 | 7.7 | HB | <3B | Acceptable | Acceptable Large joints |
| C33 90/10 - Flux/binder 52.3% TNV 11.57 lb/gal | Flux - 47.07% Wacker Pioloform ® BS-18 (high viscosity PVB) - 5.23% Dipropylene Glycol Monomethyl Ether (DPM) - 47.70% | 5 | 3.7 | HB | <3B | Acceptable | Not Acceptable Skips in joints |
| | | 7 | 5.6 | HB | <3B | Acceptable | Acceptable |
| C34 90/10 - Flux/binder 52.3% TNV 11.57 lb/gal | Flux - 47.07% Sekisui S-Lec BH-3 (ultra high viscosity PVB) - 5.23% Dipropylene Glycol Monomethyl Ether (DPM) - 47.70% | 5 | 3.7 | HB | <3B | Acceptable | Acceptable |
| | | 7 | 5.7 | HB | <3B | Acceptable | Acceptable Large joints |
| C35 90/10 - Flux/binder 60.8% TNV 12.43 lb/gal | Flux - 54% Sekisui S-Lec BM5Z (high viscosity PVB) - 6% 30-35 CPS Nitrocellulose - 0.8% Dipropylene Glycol Monomethyl Ether (DPM) - 39.2% | 5 | 4.4 | HB | <3B | Acceptable | Not Acceptable Skips in joints |
| | | 7 | 6.5 | HB | <3B | Acceptable | Not Acceptable Skips in joints |
| C36 90/10 - Flux/binder 61.25% TNV 12.36 LB/Gal. | Flux - 54% Sekisui S-Lec BM5Z (high viscosity PVB) - 6% Paraffin 139° F. melting point - 1.25% Dipropylene Glycol Monomethyl Ether (DPM) - 38.75% | 5 | 4.2 | HB | <3B | Acceptable | Not Acceptable Small joints Skips in joints |
| | | 7 | 5.9 | HB | <3B | Acceptable | Acceptable |
| 37 95/5 - Flux/binder 68.9% TNV 14.57 lb/gal | Flux - 65.45% Wacker Pioloform ® BN18 (low viscosity PVB) - 3.45% Dipropylene Glycol Monomethyl Ether (DPM) - 31.10% | 5 | 7.0 | 2B | <3B | Not Acceptable | Acceptable Large joints |
| | | 7 | 10.9 | 2B | <3B | Not Acceptable | Acceptable Large joints |
| C38 60/40 - Flux/binder 51.7% TNV 10.27 lb/gal | Flux - 31.0% Wacker Pioloform ® BN18 (low viscosity PVB) - 20.7% Dipropylene Glycol Monomethyl Ether (DPM) - 48.3% | 7 | 3.6 | HB | <3B | Acceptable | Not Acceptable Very poor Black Residue |
| | | 9 | 4.4 | HB | 3B | Acceptable | Not Acceptable Very poor Black Residue |
| | | 12 | 5.2 | HB | <3B | Acceptable | Not Acceptable Very poor Black Residue |
| C39 80/20 - Flux/binder 60.3% TNV 12.42 lb/gal | Flux - 48.22% Wacker Pioloform ® BN18 (low viscosity PVB) - 12.08% Dipropylene Glycol Monomethyl Ether (DPM) - 39.7% | 5 | 5.5 | HB | 2B | Acceptable | Acceptable |
| | | 7 | 10.7 | HB | <3B | Acceptable | Acceptable |
| C40 75/25 - Flux/binder 57.7% TNV 11.77 lb/gal | Flux - 43.06% Wacker Pioloform ® BN18 (low viscosity PVB) - 14.66% Dipropylene Glycol Monomethyl Ether (DPM) - 42.28% | 5 | 3.8 | HB | B | Acceptable | Acceptable |
| | | 7 | 6.0 | HB | 2B | Acceptable | Acceptable |
| C41 85/15 - Flux/binder 62.9% TNV 13.07 lb/gal | Flux - 53.39% Wacker Pioloform ® BN18 (low viscosity PVB) - 9.49% Dipropylene Glycol Monomethyl Ether (DPM) - 37.12% | 5 | 5.3 | HB | <3B | Acceptable | Acceptable |
| | | 7 | 7.9 | HB | 2B | Acceptable | Acceptable |

While this invention has been described with respect to particular embodiments thereof, it is apparent that numerous other forms and modifications of the invention will be obvious to the skilled artisan. The appended claims and this invention should be construed to cover all such obvious forms and modifications which are within the true spirit and scope of the present invention. Having described the presently preferred embodiments, it is to be understood that the invention may be otherwise embodied within the scope of the appended claims.

What is claimed is:

1. A method of making a flux-coated aluminum brazing sheet comprising:
   (a) combining a brazing flux with polyvinyl butyral binder to form a first mixture, wherein the brazing flux has an initial brazing flux particle size, wherein the brazing flux comprises a metal element;
   (b) shearing said first mixture to form a second mixture having dispersed brazing flux particles in said second mixture, wherein about 100% of the dispersed brazing flux particles have a final brazing flux particle size on the order of about 1 micron or less, and said shearing step further reduces the initial brazing flux particle size by at least about 50% to the final brazing flux particle size;
   (c) combining said second mixture with an organic solvent to form a brazing flux mixture;
   (d) coating at least a portion of the surface of an aluminum brazing sheet with said brazing flux mixture; and
   (e) drying said brazing flux mixture on said aluminum brazing sheet surface.

2. The method of claim 1 wherein said solvent is selected from the group consisting of alcohols, glycol ethers, ketones, esters and mixtures thereof.

3. The method of claim 1 wherein said organic solvent is selected from the group consisting of ethyl acetate, n-butyl acetate, n-propyl acetate, acetone, cyclohexanone, ethyl alcohol, isopropyl alcohol, n-butanol, n-propyl alcohol, diacetone alcohol, dipropylene glycol monomethyl ether, propylene glycol methyl ether acetate and mixtures thereof.

4. The method of claim 1 wherein said organic solvent is a toluene mixture with at least one alcohol selected from the group consisting of ethyl alcohol, isopropyl alcohol, nbutanol, n-propyl alcohol, and diacetone alcohol.

5. The method of claim 1 wherein said solvent is a mixture of either propylene glycol methyl ether acetate, isopropyl alcohol and ethyl acetate; or dipropylene monomethyl glycol ether, isopropyl alcohol and ethyl acetate.

6. The method of claim 1 wherein said brazing flux is a potassium fluoroaluminate, a cesium potassium fluoroaluminate, a zinc potassium fluoroaluminate, or a silicon and potassium fluoroaluminate mixture.

7. The method of claim 1 wherein said aluminum brazing sheet comprises a 3XXX, 5XXX, or 6XXX aluminum core alloy clad on at least one side with a 4XXX series brazing alloy.

8. The method of claim 1 wherein said aluminum brazing sheet comprises a 3XXX aluminum core alloy comprising about 1 wt. % manganese, about 0.3 wt. % copper, and about 0.15 wt. % titanium, and the balance aluminum, said core alloy clad with a 4XXX aluminum braze alloy comprising about 10 wt. % silicon, and the balance aluminum, and wherein said 4XXX alloy is clad to at least one side of said 3XXX series alloy, and said 4XXX series alloy comprises at least 5% of said total brazing sheet thickness, and said 3XXX series alloy comprises not more than 95% of said total brazing sheet thickness.

9. A method of making a brazing flux mixture comprising:
   (a) combining a brazing flux with a polyvinyl butyral binder to form a first mixture, wherein the brazing flux has an initial brazing flux particle size, wherein the brazing flux comprises a metal element;
   (b) shearing said first mixture with a 2-roll mill comprising two cylindrical rolls rotating at different speeds and in opposite directions in relation to one other to form a second mixture having dispersed brazing flux in said binder, wherein about 100% of the dispersed brazing flux particles have a final brazing flux particle size on the order of about 1 micron or less, and said shearing step further reduces the initial brazing flux particle size by at least about 50% to the final brazing flux particle size; and
   (c) combining said second mixture with an organic solvent to form a brazing flux mixture.

10. The method of claim 9 wherein said brazing flux is potassium fluoroaluminate, a cesium potassium fluoroaluminate, a zinc potassium fluoroaluminate, or a silicon and potassium fluoroaluminate mixture.

11. The method of claim 9 wherein said solvent is selected from the group consisting of alcohols, glycol ethers, ketones, esters and mixtures thereof.

12. The method of claim 9 wherein said organic solvent is selected from the group consisting of ethyl acetate, n-butyl acetate, n-propyl acetate, acetone, cyclohexanone, ethyl alcohol, isopropyl alcohol, n-butanol, n-propyl alcohol, diacetone alcohol, dipropylene glycol monomethyl ether, propylene glycol methyl ether acetate and mixtures thereof.

13. The method of claim 9 wherein said organic solvent is selected from the group consisting of toluene mixed with at least one alcohol selected from the group consisting of ethyl alcohol, isopropyl alcohol, n-butanol, n-propyl alcohol, and diacetone alcohol.

14. The method of claim 9 wherein said solvent is a mixture of either propylene glycol methyl ether acetate, isopropyl alcohol and ethyl acetate; or dipropylene monomethyl glycol ether, isopropyl alcohol and ethyl acetate.

15. A method of making a shaped metal alloy product comprising:
   (a) combining a brazing flux with polyvinyl butyral binder to form a first mixture, wherein the brazing flux comprises a metal element;
   (b) shearing said first mixture to form a second mixture having dispersed brazing flux particles in said second mixture, wherein about 100% of the dispersed brazing flux particles have a final brazing flux particle size on the order of about 1 micron or less, and said shearing step further reduces the initial brazing flux particle size to the final brazing flux particle size by at least 50%;
   (c) combining said second mixture with an organic solvent to form a brazing flux mixture;
   (d) coating at least a portion of the surface of at least two aluminum alloy brazing sheets with said brazing flux mixture;
   (e) drying said brazing flux mixture on said aluminum alloy brazing sheet surfaces;
   (f) forming said flux coated aluminum alloy brazing sheets into flux coated parts having predetermined shapes; and
   (g) brazing said parts together to form a shaped metal alloy product.

16. The method of claim 1 comprising the shearing of the first mixture with a 2-roll mill comprising two cylindrical rolls rotating at different speeds and in opposite directions in relation to one other.

17. The method of claim 15 comprising the shearing of the first mixture with a 2-roll mill comprising two cylindrical rolls rotating at different speeds and in opposite directions in relation to one other.

* * * * *

UNITED STATES PATENT AND TRADEMARK OFFICE
CERTIFICATE OF CORRECTION

| | | |
|---|---|---|
| PATENT NO. | : 7,337,941 B2 | Page 1 of 1 |
| APPLICATION NO. | : 10/419520 | |
| DATED | : March 4, 2008 | |
| INVENTOR(S) | : Darwin H. Scott et al. | |

It is certified that error appears in the above-identified patent and that said Letters Patent is hereby corrected as shown below:

In the Claims:

In Column 15, line 42, before "n-propyl", delete "nbutanol," and insert --n-butanol,--.

In Column 16, line 5, after "one", delete "other" and insert --another--.

In Column 16, line 61, after "one", delete "other" and insert --another--.

In Column 16, line 65, after "one", delete "other" and insert --another--.

Signed and Sealed this

Fourth Day of November, 2008

JON W. DUDAS
*Director of the United States Patent and Trademark Office*